United States Patent [19]

Valier

[11] Patent Number: 4,593,803

[45] Date of Patent: Jun. 10, 1986

[54] CLUTCH MECHANISM

[75] Inventor: Carlo Valier, Turin, Italy

[73] Assignee: Valeo, Paris, France

[21] Appl. No.: 622,173

[22] Filed: Jun. 19, 1984

[30] Foreign Application Priority Data

Jun. 22, 1983 [FR] France .................. 83 10310

[51] Int. Cl.[4] ............................................ F16D 13/60
[52] U.S. Cl. .................. 192/112; 192/70.18; 192/70.27
[58] Field of Search ............... 192/112, 70.18, 70.27

[56] References Cited

U.S. PATENT DOCUMENTS

| 2,079,389 | 5/1937 | Wemp | 192/112 |
| 2,694,478 | 11/1954 | Zeidler | 192/70.18 |
| 3,167,163 | 1/1965 | Smirl et al. | 192/70.18 |
| 3,554,342 | 1/1971 | Spokas | 192/70.18 |
| 4,069,905 | 1/1978 | de Gennes | 192/112 |
| 4,122,929 | 10/1978 | Maucher et al. | 192/70.18 |
| 4,423,804 | 1/1984 | Kettell et al. | 192/70.18 |
| 4,425,991 | 1/1984 | Hays | 192/70.27 |
| 4,450,945 | 5/1984 | Caray | 192/70.27 |

FOREIGN PATENT DOCUMENTS

| 2300933 | 9/1976 | France . | |
| 2381938 | 9/1978 | France . | |
| 833023 | 4/1960 | United Kingdom . | |
| 1233968 | 6/1971 | United Kingdom | 192/70.18 |
| 1577243 | 10/1980 | United Kingdom . | |

Primary Examiner—Alan Cohan
Assistant Examiner—John A. Rivell
Attorney, Agent, or Firm—Charles E. Brown; Charles A. Brown

[57] ABSTRACT

A motor vehicle clutch is provided with a cover which has, on its periphery, zones for fastening the cover to the reaction plate alternating with zones for coupling the cover to the pressure plate. The fastening zones are axially offset from the coupling zones and are provided with radial bearing lugs alternating with axially extending skirt portions which form spacers between the lugs and the reaction plate. The cover is fastened to the reaction plate by screws which pass through apertures in the lugs and into corresponding tapped bores in the reaction plate.

11 Claims, 6 Drawing Figures

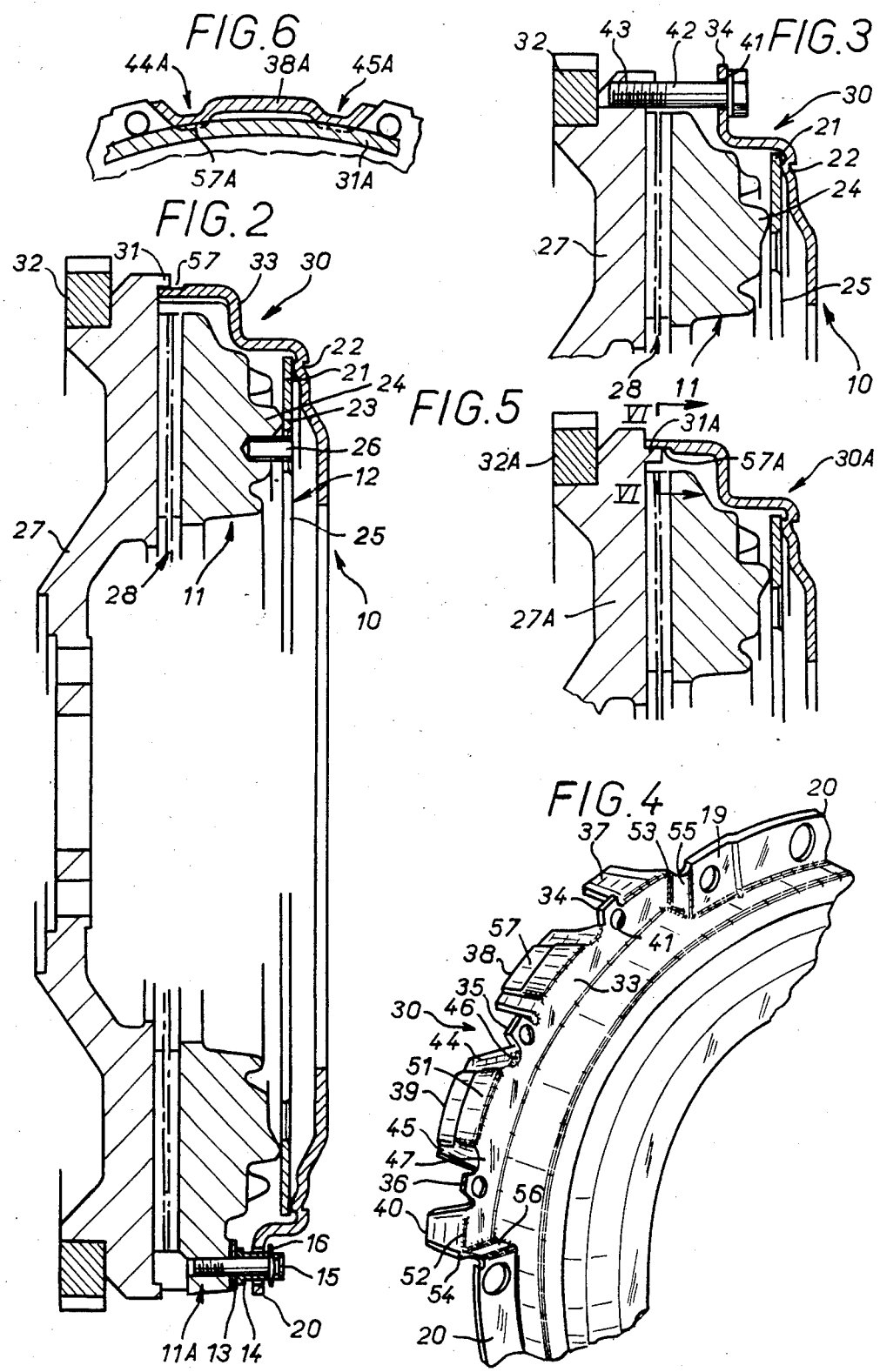

CLUTCH MECHANISM

BACKGROUND TO THE INVENTION

The present invention relates, in general terms, to clutches intended especially for equiping motor vehicles and comprising, in particular, an annular piece called a cover, a first plate called a pressure plate, intergral in terms of rotation with the said cover and mounted so as to be axially movable relative to the latter, elastic means with controllable axial action, which, interposed between the said cover and the said pressure plate, tend, in particular, to move the latter away from the said cover, a friction disc intended to be coupled in terms of rotation to a first shaft, in general a driven shaft, and a second plate called a reaction plate, intended to be coupled to a second shaft, in general a drive shaft.

It is customary to join together the cover, the pressure plate and the elastic means with controllable action which are interposed between them, in order to form a unit assembly or a mechanism ready to be subsequently mounted directly as such on the associated reaction plate.

DESCRIPTION OF PRIOR ART

Assembly on the reaction plate is generally carried out by means of fastening members, such as screws, which are suitably distributed over the periphery of the cover and which pass onto the outside of the pressure plate and the friction disc. This results in clutch mechanisms of the type described, for example, in French Patent No. 81/11,596, in which the cover has a considerably larger diameter than that of the friction disc and pressure plate, thus entailing an increase in the weight, inertia and bulk of the mechanism, and this may be undesirable, especially in heavy-goods vehicles.

French Patent No. 75/04,432 discloses a technique for producing a clutch mechanism, which makes it possible to limit the diameter of the cover to a value only slightly greater than the diameter of the pressure plate and friction disc; this technique essentially involves providing substantially radial fastening zones of the cover by arranging spacers so as to project from these zones, each of these spacers having, at a distance from the fastening zone from which it projects, a bearing surface by means of which it is designed to come up against the associated reaction plate. These spacers or elevations can advantageously be arranged in line with the thickness of the plate and allow fastening screws to pass between them. However, this technique results in the use of a number of additional pieces, and the disadvantage of this is that it complicates the construction, and production is difficult to mechanise because of the large number of components.

SUMMARY

The object of the present invention is to avoid the various disadvantages mentioned above by making it possible to limit the diameter of the cover, whilst at the same time avoiding the need for additional components.

For this purpose, in a mechanism of the type in question, the invention proposes a one-piece cover with, on its periphery, an alternating sequence of radial zones for coupling to the pressure plate and zones for fastening to the reaction plate, these fastening zones comprising a radial bearing zone with a least one bearing lug alternating with at least one skirt portion forming a spacer. The radial zones define for the fastening members a bearing plane offset axially in relation to the coupling zones and advantageously located approximately at half the height of the cover.

By means of this arrangement, it becomes possible to ensure that in the fastening zones of the cover the profile of the latter follows as closely as possible the contour of the mechanism up to an axial level chosen for the bearing zones, for example at half the height of the cover, subsequently to extend from the periphery of the pressure plate and friction disc only the distance which is strictly necessary for the passage of the fastening members.

According to a preferred embodiment, each of the fastening zones incorporates a plurality of radial bearing lugs which alternate on the periphery of the cover with skirt portions forming spacers, and these skirt portions can then advantageously be aligned with passages intended for fastening members and provided in the bearing lugs.

BRIEF DESCRIPTION OF THE DRAWINGS

FIG. 2 is a corresponding view in an axial section along the broken line II—II of FIG. 1, showing the cover with the mechanism;

FIG. 3 is a sectional view along a plane III—III of FIG. 1;

FIG. 4 is a partial view of the cover;

FIG. 5 is a partial view similar to that of FIG. 2, showing an alternative form; and FIG. 6 is a partial sectional view along a plane VI—VI of FIG. 5.

DETAILED DESCRIPTION OF EMBODIMENTS OF THE INVENTION

Figure 1:
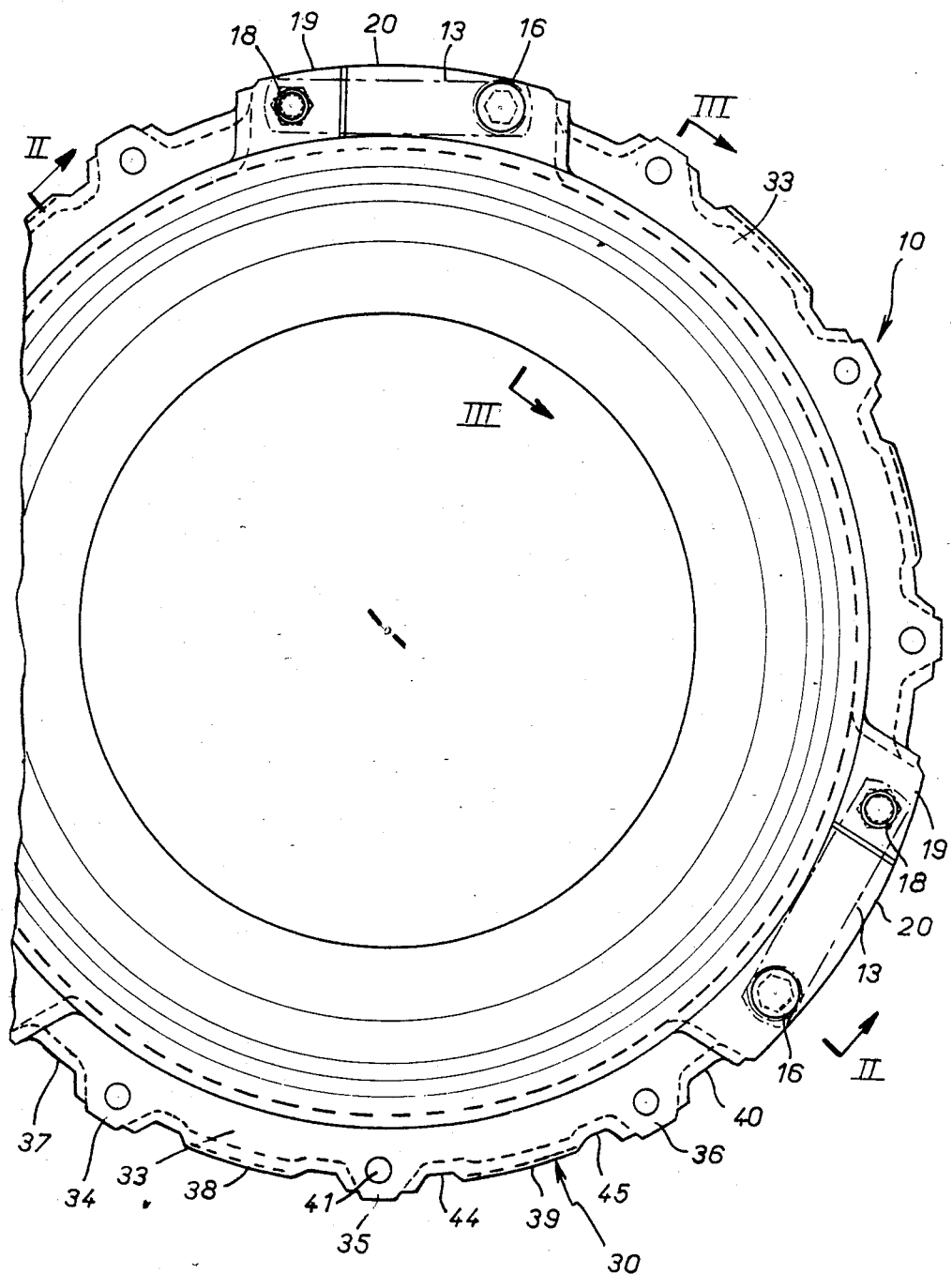
FIG. 1 is a partial elevation view of a clutch-mechanism cover according to the invention.

According to the embodiment illustrated in FIGS. 1 to 4, the clutch mechanism substantially comprises, in a way known per se, an annular cover 10, a pressure plate 11, which is fixed in terms of rotation with the cover 10, whilst being axially movable relative to the latter, and elastic means 12 which are interposed between the cover 10 and the pressure plate 11 and which normally tend to move the pressure plate 11 away from the cover 10.

In a way known per se, the pressure plate 11 is fixed in terms of rotation with the cover 10 by means of tangential tabs 13 which extend substantially tangentially from the pressure plate 11 to the cover 10 at points which are distributed circularly over these two annular pieces, and of which there are three in the example illustrated. These tangential tabs are, on the one hand, secured to the pressure plate 11 by means of tubular immobilising pieces 14 (FIG. 2) locked under the screw head 15 screwed into the plate, these heads bearing on the tubular immobilising piece 14 by means of bearing washers 16. The tubular immobilising pieces 14 pass with play through orifices provided for this purpose in the peripheral region of the cover, and more specifically in the vicinity of one of the two ends of each of the so-called coupling radial zones 20 which alternate on the periphery of the cover with fastening zones designated as a whole by reference numeral 30, the structure of which will be discussed in more detail below. The tangential tabs 13 are, on the other hand, fastened, for example by riveting 18, in the vicinity of the end, opposite the preceding end, of each coupling zone 20, to bearing surfaces 19 offset axially in the direction of the pressure plate.

In the example illustrated, and in a way known per se, the elastic means 12 interposed between the cover 10 and the pressure plate 11 consist of an annular diaphragm 2 forming an elastic washer of the Belleville type which bears at its outer periphery on the cover 10 by means of an axial projection 22 made continuously or discontinuously on the periphery of the front wall of the cover. This washer is mounted so as to tilt in the vicinity of its inner periphery on the edge 23 of an annular rib 24 of the pressure plate. Moreover, the annular diaphragm 21 possesses radial extensions 25 which form disengaging fingers. Reference numeral 26 denotes a stud for centering the diaphragm on the pressure plate 11, this stud being placed between two fingers 25 at the root of the latter.

Such a unit assembly is intended to be attached to a reaction plate 27 for clamping a friction disc 28 between this reaction plate and the pressure plate 11.

Such a reaction plate 27, which in general is intended to be fixed in terms of rotation with a drive shaft, and the associated friction disc 28 which in general is intended to be fixed in terms of rotation with a driven shaft, have been merely indicated briefly in FIG. 2, and these components are, in fact, well known per se, and since they do not form part of the invention they will not be described in detail. It will be sufficient to note that the reaction plate 27 has, in this case, on its periphery an axial extension 31 opposite the mechanism and also serves in a conventional way as a support for a starter ring 32.

The structure of the cover 10 will now be dealt with in more detail, and it will be noted (see, in particular, FIG. 2) that radially on the outside of the circular bead 22 on which the diaphragm bears the profile of the cover substantially follows the profile of the diaphragm 21 and of the pressure plate 11 at a short distance.

Coupling zones 20 are formed on the peripheral part of the cover for coupling the cover to the pressure plate and extend in a radial plane parallel to an opposing axial face of a corresponding coupling lug of the pressure plate, such as that indicate in 11A in the lower part of FIG. 2. Since this arrangement is known per se, it will suffice to note that the relative axial movement between the cover 10 and the plate 11 is limited by the axial distance provided between each bearing washer 16 and the opposing face of the associated tab 13. In other words, this axial movement is dertermined by the height of the tubular bearing piece 14.

The invention relates, more particularly, to the arrangement of so-called fastening zones 30 which alternate on the periphery of the cover with the radial coupling zones 20. As can be seen in particular in the upper part of FIG. 2, the general profile of the periphery of the cover substantially follows, at a relatively short distance, the outline of the profile of the pressure plate and friction disc, finally being fitted inside the peripheral axial extension 31 of the reaction plate. However, towards half the height of the cover in the axial direction, the fastening zone 30 forms a radial zone 33 called a bearing zone, this zone being designed to rest on the reaction plate on the radially outer side by means of skirt portions forming spacers.

As can be seen more clearly in FIGS. 1, 3 and 4, according to the embodiment under consideration, in each of the fastening zones 30 radial lugs 34, 35, 36 alternate with skirt portions 37, 38, 39,40. Each of the bearing or fastening lugs 34 35, 36 is perforated with a hole 41 for the passage of a fastening member, such as a screw 42 (see FIG. 3), designed to be fastened in a corresponding tapped bore 43 in the reaction plate 27.

Each of the skirt portions, such as, for example, 39 (FIG. 4), possesses stiffening ribs 44, 45 of general axial orientation, which are connected to the radial bearing zone 33 by means of buttressing fillets 46, 47 respectively, framing the adjacent fastening lugs. Each skirt portion possesses, on the other hand, over the entire length of its circular extent between its stiffening ribs, a fillet buttressing the bearing zone 33, as indicated, for example, at 51 on the skirt portion 39 and at 52 for the skirt portion 40.

The stiffening ribs of the end skirt portions 37 and 40 are on the outside and terminate each fastening zone 30, the latter being connected by means of respective end fillets 53, 54 to rims 55, 56 of general axial orientation for buttressing the adjacent coupling zones 20. The axial extent of these buttressing rims 55, 56 determines an axial offset between the coupling zones 20, on the one hand, and the bearing plane, on the other hand which is formed for the fastening members 42 by the radial zones 33, such as are completed by the radial lugs 34 to 36 in the embodiment illustrated. This axial offset is advantageous in that it makes it possible to reduce the distance between the bearing plane, defined by the bearing zones 33, and the opposing face of the reaction plate 27, and therefore to reduce the length of the fastening members 42. Of course, bringing the bearing plane nearer to the reaction plate results in a reduction in the axial height of the skirt portions 37 to 40 which act as spacers and supports for the bearing zones 33 opposite the reaction plate.

In the embodiment illustrated in FIGS. 1 to 4, the cover is centred in relation to the reaction plate by means of centring bearing surfaces, such as 57, which are machined on the radially outer end parts of the complete skirt portions 38 and 39, for interaction by means of fitting (see FIG. 2) with the cylindrical bearing surface presented by the axial extension 31 of the reaction plate, whilst the end skirt portions 37 and 40 can remain radially within the cylindrical fitting surface defined by the centring bearing surfaces 57 of the inner skirt portions 38 and 39 of each fastening zone 30.

In the alternative embodiment illustrated in FIGS. 5 and 6, the cover is centred as a result of the fitting of the skirt portions forming spacers on the radially outer side of an axial extension 31A of the reaction plate 27A. On a skirt portion, such as that illustrated at 38A in FIG. 6, centring bearing surfaces 57A are machined for this purpose on the radially inner face of the skirt portion, and more specifically on the end of parts of the stiffening ribs 44A and 45A.

Although requiring an additional machining operation for the reaction plate 27A on the radially outer side of the axial extension 31A of the reaction plate, this centring, in which the cover caps the radial extension 31A of the reaction plate, may be preferred because it thereby becomes somewhat easier, in practice, to install the mechanism on the reaction plate.

In fact, with a cover which is centred in this way by means of its inside diameter as soon as the cover rests on the flywheel by its top part, centring can be carried out in a state of stable equilibrium of the mechanism, without the entire weight of the latter having to be supported. It is appropriate to emphasise that in all the cases considered the passages 41 for the fastening members 42 are substantially aligned in a circular direction with the skirt portions 37-40 forming spacers; this arrangement ensures that the fastening zones according to the invention have maximum effectiveness, whilst at the same time guaranteeing that the weight and bulk of the mechanism are limited to the desired extent.

The cover according to the invention can advantageously be produced from sheet metal by stamping and cutting out, followed by a simple machining operation for finishing.

I claim:

1. A clutch mechanism especially for a motor vehicle, said clutch mechanism comprising a one-piece stamped cover, a pressure plate, axially acting elastic means biasing said pressure plate away from said cover and permitting axial movement of said pressure plate relative to said cover and rotational movement of said pressure plate with said cover, said cover having along a periphery thereof in circumferentially alternating relation coupling rim portions and fastening rim portions, means for coupling said pressure plate to said cover being secured to said cover in said coupling rim portions, said fastening rim portions having circumferentially alternating axially extending skirt portions and radial lugs, said skirt portions depending from associated ones of said fastening rim portions and said lugs radially extending from associated ones of said fastening rim portions, said lugs accommodating means for fastening said cover to a reaction plate.

2. The clutch mechanism according to claim 1, wherein said means accommodating means for fastening said cover to a reaction plate comprises openings through said lugs for receiving fastening members, said openings and said skirt portions lying along a common circumference of said clucth mechanism.

3. The clutch mechanism according to claim 1, said cover having a large central opening surrounded by a generally radial portion, said coupling rim portions being axially set back from said generally radial portion, and and fastening rim portions being axially set back from said coupling rim portions.

4. The clutch mechansim according to claim 1, wherein there are a plurality of said radially extending lugs alternating with a plurality of said skirt portions at each of said fastening rim portions.

5. The clutch mechanism according to claim 1, wherein said cover has an axis, said fastening rim portions are generally in a common plane disposed approximately midway along said axis of said cover.

6. The clutch mechanism according to claim 3, wherein said cover has an axis, said fastening rim portions are generally in a common plane disposed approximately midway along said axis of said cover.

7. The clutch mechanism according to claim 1, wherein each of said skirt portions has two spaced generally axial stiffening ribs and a buttressing fillet connecting each of said skirt portions to an associated one of said fastening rim portions.

8. The clutch mechanism according to claim 7, wherein each of said radially extending lugs is circumferentially framed by respective buttressing fillets on said stiffening ribs of adjacent ones of said skirt portions.

9. The clutch mechanism according to claim 1, wherein at least some of said skirt portions comprise centering bearing surfaces cooperable with a cylindrical surface on a reaction plate for centering said cover relative to such reaction plate.

10. The clutch mechanism according to claim 9, wherein said centering bearing surfaces are formed on a radially outer side of a free end part of said some skirt portions for internal fitting engagement with the cylindrical surface on the reaction plate.

11. The clutch mechanism according to claim 9, wherein said centering bearing surfaces are formed on the radially inner side of a free end part of said some skirt portions for external fitting engagement with the cylindircal surface on the reaction plate.

* * * * *